Figure 1:
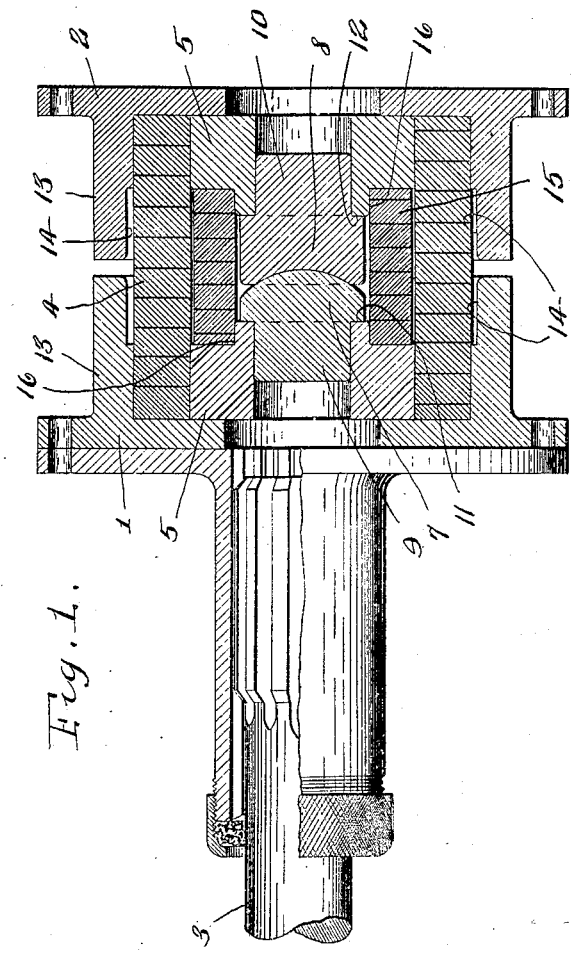

Aug. 19, 1924.

M. R. KARGE 1,505,596

CUSHION SHAFT COUPLING OR UNIVERSAL JOINT

Filed June 23, 1920

INVENTOR.
Maxwell R. Karge.
BY Parsons & Bodell
ATTORNEYS.

Patented Aug. 19, 1924.

1,505,596

UNITED STATES PATENT OFFICE.

MAXWELL ROY KARGE, OF PHOENIX, NEW YORK, ASSIGNOR, BY MESNE ASSIGNMENTS, TO CHARLES J. DECKOP, OF BUFFALO, NEW YORK.

CUSHION SHAFT COUPLING OR UNIVERSAL JOINT.

Application filed June 23, 1920. Serial No. 391,069.

*To all whom it may concern:*

Be it known that I, MAXWELL R. KARGE, a citizen of the United States, and a resident of Phoenix, in the county of Oswego and State of New York, have invented a certain new and useful Cushion Shaft Coupling or Universal Joint, of which the following is a specification.

This invention relates to flexible power transmitting elements or cushion couplings of the type set forth in my Patent 1,387,726, issued Aug. 16, 1921, on my pending application Sr. No. 285,762, filed March 28, 1919; and Patent 1,429,146, issued Sept. 12, 1922, upon application Sr. No. 273,548, filed January 28, 1919, has for its object a coupling especially applicable for use as a universal joint, which is particularly simple in construction and highly efficient and durable in use.

In describing this invention, reference is had to the accompanying drawings in which ike characters designate corresponding parts in all the views.

Figure 1 is a vertical longitudinal sectional view of a coupling embodying my invention.

The coupling comprises opposing sections for connection with driving and driven shafts, said sections having internal hubs formed with axial bores, a coiled spring connected at its ends to the sections respectively and having its end coils enclosing said hubs, and means for centering the coupling including ball and socket members having shanks held in the bores of the hub.

1 and 2 are, respectively, the opposing sections which are connected to shafts as 3 from and to which motion is to be transmitted by the coupling. 4 designates the coiled torsion spring. 5 are the internal hubs of the sections, these hubs having axial bores 6. 7 and 8 are respectively, ball and socket members or their equivalent, said members having shanks 9 and 10 respectively fitting the bores of the hubs, and heads which abut at 11, and 12 respectively against the inner end faces of the hubs.

Each section 1 or 2 comprises a head having an annular flange or sleeve 13 which is opposed to and spaced apart from the hub 5 and forms therewith an annular recess in which the end coils of the spring 4 are firmly held. The hubs are practically annular plugs driven in the end coils of the spring. The flanges or sleeve 13 are cut away at 14 to form a clearance which permits the intermediate coils of the spring to expand as in my Patent No. 1,471,488, issued Oct. 23, 1923, upon an application filed Jan. 23, 1920, and also a floating sleeve 15 is located within the intermediate coils, on which said coils contract, the sleeve 15 being mounted at its ends in annular grooves or rabbets 16 formed in the inner ends of the hubs or plugs 5. The construction of the heads, spring, floating sleeve and plug in themselves, forms no part of this invention, but constitutes the subject matter of my Patent 1,471,488, issued Oct. 23, 1923, above referred to.

In operation, during movement of one section relatively to the other, due to changes in the angles of the axes of the sections 1, 2 and the shafts to which they are connected, the ball and socket joint centers the sections and prevents one section dropping or lobbing relatively to the other.

Owing to the construction of the coupling the parts can be readily assembled in a compact structure.

What I claim is:

1. A flexible coupling comprising opposing sections formed with central bores; a coiled torsion spring having its ends fixed to the sections and ball and socket members having shanks fitting the bores, substantially as and for the purpose described.

2. A flexible coupling comprising opposing sections formed with central bores, a coiled torsion spring having its end coils fixed to the sections, and ball and socket members having shanks fitting the bores, and heads abutting against the end surfaces of the sections around the inner ends of the bores, said heads being formed respectively with ball and socket surfaces on their meeting ends, substantially as and for the purpose specified.

3. A flexible coupling comprising opposing sections formed with central bores, a coiled torsion spring having its end coils fixed to the sections, and ball and socket members having shanks fitting the bores, and heads abutting against the end surfaces of the sections around the inner ends of the bores, said heads being of substantially the same diameter as portions of the head formed with the bores and around which the end coils of the spring extend, substantially as and for the purpose set forth.

4. A flexible power transmitting element comprising opposing sections, each comprising a head formed with an annular flange, or sleeve extension on its side opposed to the other section, an annular plug located within and spaced apart from the flange, a coiled torsion spring having its end coils held between the peripheries of the plugs and the inner faces of the inner end portions of the sleeve extensions, said plugs being inserted in the ends of the springs and ball and socket members enclosed by the spring and having shanks fitted in the bores of said plugs, substantially as and for the purpose described.

5. A flexible power transmitting element comprising opposing sections, each comprising a head formed with an annular flange or sleeve extension on its side opposed to the other section, an annular plug located within and spaced apart from the flange, a coiled torsion spring having its end coils held between the peripheries of the plugs and the inner faces of the inner end portions of the sleeve extensions, said plugs being inserted in the ends of the springs and ball and socket members enclosed by the spring and having shanks fitted in the bores of said plugs, and heads thrusting against the opposing ends of the lugs, substantially as and for the purpose specified.

6. A flexible power transmitting element comprising opposing sections, each having an internal hub, a coiled torsion spring having its end coils secured to the sections and encircling the hub, said hub having axial bores, and ball and socket joints including members arranged coaxially with the hubs between the same and having shanks fitting the bores of the hubs, substantially as and for the purpose described.

In testimony whereof, I have hereunto signed my name, at Phoenix, in the county of Oswego, and State of New York, this 19th day of April, 1920.

MAXWELL ROY KARGE.